March 31, 1953 M. O. COLDEN 2,633,030
POWER-TRICYCLE
Filed July 19, 1949 2 SHEETS—SHEET 1
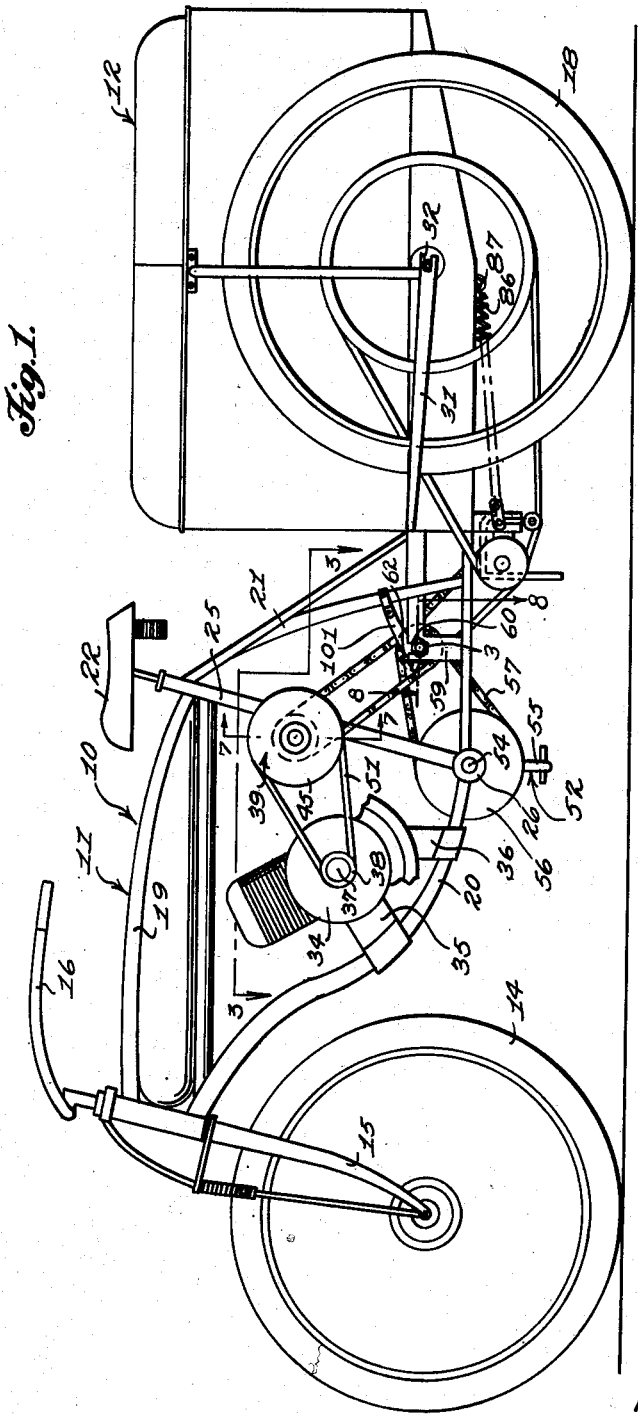
INVENTOR.
MILTON O. COLDEN
BY
McMorrow, Berman & Davidson
ATTORNEYS March 31, 1953  M. O. COLDEN  2,633,030
POWER-TRICYCLE
Filed July 19, 1949  2 SHEETS—SHEET 2
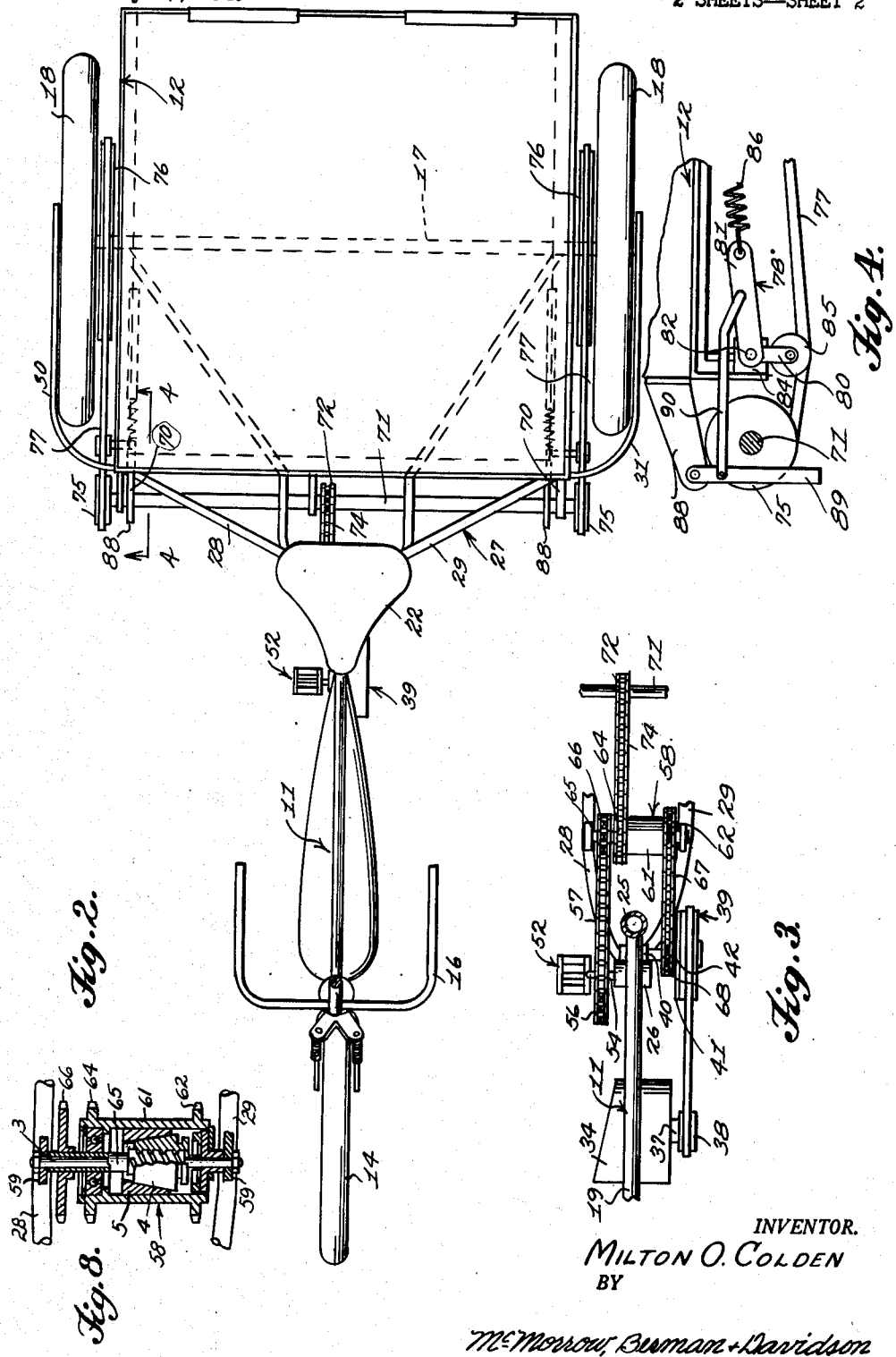
INVENTOR.
MILTON O. COLDEN
BY
McMorrow, Berman & Davidson
ATTORNEYS Patented Mar. 31, 1953

2,633,030

UNITED STATES PATENT OFFICE 2,633,030

POWER-TRICYCLE

Milton O. Colden, Clintonville, Wis.

Application July 19, 1949, Serial No. 105,603

3 Claims. (Cl. 74—217)

This invention relates to a delivery motor-tricycle, and more particularly to a motorcycle having a novel transmission or clutch arrangement between the motor and the driving wheels.

It is an object of this invention to provide a motorcycle of the kind to be more particularly described hereinafter having a starting crank for initially cranking the motor for starting and having an automatic clutch connected between the starting crank and motor which is disengaged from the starting crank when the motor is in operation, and which engages the motor with the driving axle when the motor has attained a predetermined speed.

Another object of this invention is to provide a delivery motorcycle of this kind having a conventional coaster brake connected between the motor and starting crank for starting the motor, but leaving the starting crank at rest during the operation of the motor.

Still another object of this invention is to provide a clutch or belt-tightener between the motor and driven axle for disengaging the motor from the axle for starting or idling, and engageable for driving the motorcycle.

A further object of this invention is to provide a motorcycle of this kind having a motor and clutch arrangement which may be incorporated on substantially conventional types of motorcycle frames, or may be secured on special frames formed for supporting the motor and clutch arrangement.

With the above and other objects in view, my invention consists in the arrangement, combination and details of construction disclosed in the drawings and specification, and then more particularly pointed out in the appended claims.

In the drawings:

Figure 1 is a side elevation of a motor tricycle constructed according to an embodiment of my invention;

Figure 2 is a top plan view thereof;

Figure 3 is a fragmentary detail section taken on the line 3—3 of Figure 1;

Figure 4 is a fragmentary detail section taken on the line 4—4 of Figure 2;

Figure 5 is a fragmentary detail section of the automatic clutch and ratchet of the driving means for the motorcycle;

Figure 6 is a fragmentary detail section taken on the line 6—6 of Figure 5.

Figure 7 is a fragmentary sectional view taken on the line 7—7 of Figure 1.

Figure 8 is a sectional view taken on the line 8—8 of Figure 1.

Referring to the drawings, the numeral 10 designates generally a novel motorcycle constructed according to an embodiment of my invention, and includes a frame 11 having a box or carrier 12 mounted on the rear end thereof. A front wheel 14 is carried by the forward end of the frame 11 and is connected to the fork 15 which is rotatably supported in the forward end of the frame 11 and operatively connected with a steering handle 16. The forward end of the frame 11 is formed in a substantially conventional manner, while the rear end of the frame 11 is formed for supporting the box 12 thereon and for supporting the axle 17 on which the pair of rear wheels 18 are rotatably mounted.

The forward end of the frame 11 includes a top frame member 19 and a lower longitudinally-extending frame member 20. A connecting bar 21 is fixed at its upper end to the upper frame member 19 and at its lower end to the rear end of the lower frame member 20. The seat 22 is adjustably supported on the upper end of a seat-supporting frame member 25 which is secured at its upper end to the rear end of the top frame member 19 and at its lower end to the lower frame member 20 intermediate the length thereof. The lower end of the seat-supporting member 25 is fixedly secured on the outer surface of a boss 26 which is fixed to or formed integrally with the lower longitudinally-extending frame member 20.

A bifurcated rear frame 27, including a pair of rearwardly-divergent side frame members 28 and 29, is fixed at its forward end to the frame 11 and extends rearwardly therefrom. The rear ends of the frame members 28 and 29 are fixedly secured to the box 12 for fixedly supporting the box 12 on the rear end of the frame 11, as clearly shown in Figures 1 and 2 of the drawings. The extreme outer ends of the rear axle 17 are rotatably carried by the rear ends of a pair of secondary frame members 30 and 31 which are fixedly carried by the frame members 28 and 29 and clearly shown in Figure 2 of the drawings. The secondary frame members 30 and 31 are engaged about the outer side of the rear wheels and engage the outer ends of the axle 17 on the outer side of the wheels 18.

The rear ends of the secondary frame members 30 and 31 are formed with longitudinally-extending, rearwardly-opening slots 32 on the rearmost ends thereof within which the outer ends of the axle 17 are adapted to be adjustably and slidably engaged for the purpose to be described hereinafter.

A substantially conventional internal combustion motor 34 is fixedly supported on the frame 11 between the upper and lower frame members 19 and 20, respectively. A pair of bracket members 35 and 36 are fixed at one end on the lower frame member 20 and extend upwardly therefrom for fixed engagement with selected portions of the engine or motor 34 for fixedly supporting the motor on the frame 11. The motor 34 includes a motor shaft 37 having a pulley 38 fixed on the outer end thereof and extending on one side of the frame 11.

An automatic clutch 39 is fixedly supported on the frame 11 and preferably is fixedly supported rearwardly of the motor 34, as on the vertically-extending seat-supporting frame member 25, clearly shown in Figure 1 of the drawings. The automatic clutch 39 is rotatably supported on suitable brackets 40 which are fixedly secured to the vertically-extending frame member 25 intermediate the length thereof.

The first shaft 42 extending inwardly of the frame and rotatable in one direction is arranged in parallel spaced relation with respect to the motor or drive shaft 37 of the motor 34. The pulley 45 is mounted on the shaft 42 for rotation therearound. Positioned in side by side relation with respect to the pulley 45 and fixedly carried by the shaft 42 is a drum 41. Arranged adjacent one face of the pulley 45 contiguous to the periphery thereof are a pair of spaced shoes 49 which are mounted for movement about pivot pins 50 carried by the pulley 45 toward and away from each other and which are engageable with the inner peripheral surface of the drum 41. Resilient means or springs 49' are operatively connected to the pulley 45 and each of the shoes 49 for urging the shoes toward each other. A belt 51 is trained over the pulley 45 and the pulley 38 on the motor shaft 37 for connecting the pulley 45 to the drive or motor shaft 37. A two-part one-way clutch is provided for connecting the pulley 45 to the shaft 42, said clutch having one part fixed on the pulley 45 and having the other part mounted on the shaft 42 for movement into and out of locking engagement with the one or first named part. The one part of the one-way clutch which is on the pulley 45 comprises, Figures 6 and 7, a hub 46 having its inner surface provided with a ratchet 47, the teeth or ledges 48 of the ratchet 47 being engaged by the other part of such clutch or pawl for key 44 slidably supported in a transverse slot 43 extending through the shaft 42.

A starting crank lever 52 having a stub-shaft 54 at right angles to the lever portion 55 is rotatably engaged in the bearing or hub 26. A gear or sprocket 56 is fixedly secured to the inwardly-extending shaft 54 of the starting crank 52 for rotation therewith and a chain 57 is engaged with the sprocket 56 about the periphery thereof, and extended rearwardly of the frame 11.

A conventional type of coaster brake 58 is supported on the rear end of the frame 11 and at the forward end of the frame members 28 and 29 of the rear frame 27. An upwardly-extending supporting bracket 59 is fixed on each of the rearwardly-extending frame members 28 and 29, and the opposite ends of the coaster brake 58 are adjustably engaged in the upwardly-opened slots 60 formed in the brackets or supporting members 59. The coaster brake 58 includes an outer hub portion 61 providing a shaft having a sprocket 62 fixed on one end thereof and a second sprocket 64 fixed on the other end. A third hollow shaft 65 is rotatably supported on a stub axle 3, Figure 8, the axle extending through the hub or outer housing 61 and being fixedly supported on the brackets 59. The shaft 65 carries a male clutch element 4 which is engaged by a female clutch element 5 secured to the inner wall of the hub or housing 61 upon rotation of the shaft 65 in one direction in substantially the same manner as the normal operation of a conventional coaster brake. A conventional sprocket 66 is fixed on the shaft or central portion 65 and the rearwardly-extending chain 57 is engaged at its rear end about the sprocket 66 for rotating the hub 61 upon rotation of the starting crank 52. Arm 101 of the coaster brake takes the reaction when the device is operated as a brake i. e. crank 55 is rotated in the opposite or clockwise direction as viewed in Figure 1.

Upon rotation of the starting crank 52, the shaft 65 is rotated and the shaft 65 will engage with the hub 61 for rotating the hub 61 together with the shaft 65 and the starting crank lever 55. The rotation of the hub 61 will rotate the shaft 42 as a chain 67 is engaged about the sprocket 62 and a sprocket 68 fixed on the outer end of the shaft 42. Upon rotation of the coaster brake 58, the shaft 42 will be rotated in a direction whereupon the pawl or key 44 will engage the ratchet 47 for rotating the drum 41 and pulley 45 together, and the rotation of the pulley 45 will directly rotate the drive shaft 37 of the motor 34, as the belt 51 is engaged about the pulley 45 and about the pulley 38 carried by the drive shaft 37. In this manner the motor 34 may be started by the driver or operator of the motorcycle 10.

A pair of transversely-spaced-apart bearing members or supporting brackets 70 are fixedly supported on the opposite sides of the forward end of the box 12 and a countershaft 71 is rotatably journaled in the supporting members or bearings 70, as clearly shown in Figure 2 of the drawings. A sprocket 72 is fixedly supported to the countershaft 71 intermediate the length thereof, and a driving chain 74 is engaged about the sprocket 72 and extended forwardly for engagement about the sprocket 64 carried by the hub 61 of the coaster brake 58, and more clearly shown in Figure 3 of the drawings.

A pair of pulleys 75 are fixedly secured on the opposite ends of the countershaft 71 outwardly from the supporting members or bearings 70. A pair of correlated pulleys 76 are fixedly secured to the opposite ends of the axle 17 between the wheels 18 and the outer sides of the box 12. A suitable belt 77 is engaged about the pulleys 75 and 76 at each side of the box 12 for drivingly connecting the rear axle 17 with the motor 34.

A belt-tightener 78 is carried by the box 12 and is engageable with each of the belts 77 forming a sort of clutch between the pulleys 75 and their respective pulleys 76. The belt-tightener 78 is in the form of a horizontal bar having a forward depending lever arm 80 and a rearwardly-extending substantially horizontal lever arm 81 fixedly connected at its forward end to the upper end of the depending lever arm 80, clearly shown in Figure 4 of the drawings. A pivot pin 82 is rotatably engaged through the upper end of the vertical lever arm 80 and forward end of the horizontal lever arm 81 and is fixedly secured on a bracket 84 which is fixed to the forward end of the box 12. A pulley or idler wheel 85 is rotatably supported on the lower end of the depending lever arm 80 and engages the forward end of the lower stretch of the connecting belt 77. A rearwardly-extending spring 86 is fixed at its forward end to the rear end of the horizontal bar of the belt tightener 78 and at its rear end is fixedly secured to a suitable hook or bracket 87 fixed on the lower side of the box 12 or rear frame 27. The spring 86 constantly biases the horizontal bar of the belt tightener 78 to a substantially horizontal position with the lever arm 80 in a vertical position for engaging the idler wheel 85 with the belt 77 to hold the belt 77 in an operative belt-tightened position.

A forwardly-extending bracket member 88 is fixed at its rear end to the forward side of the lower end of the box 12 and the forward end of the bracket 88 is extended forwardly of the countershaft 71. A bracket 88 is fixed on each side of the box 12 on the forward side thereof and a lever 89 is pivotally connected at its upper end to the forward end of each of the brackets 88. The levers 89 are pivotally connected to the forward ends of the brackets 88 and a suitable connecting link 90 is pivotally connected at its forward end to an intermediate portion of each of the levers 89 and at the rear end thereof to an intermediate portion of the rearwardly-extending lever arm 81 of the bell crank 78. The belt-tightening levers 89 depend from the brackets 88 forwardly of the countershaft 71 and on the opposite sides of the seat 22 on which the operator is seated. From his position seated on the seat 22, the operator may reach down on either side of the forward end of the box 12 for lifting the lever 89 and moving the idler pulley 85 to a belt-loosening position, whereupon rotation of the countershaft 71 will not be drivingly connected with the axle 17.

In the use and operation of the motor-tricycle 10 described above, from an inoperative condition the engine 34 may be started by moving the crank lever 52 in a clockwise direction, as viewed in Figure 1 of the drawings. Upon rotation of the starting crank 52, the motor crankshaft 37 will be rotated as the crank 52 is connected to the crankshaft 37 by way of the coaster brake 58 and ratchet 47 engaged by the pawl 44. Upon starting of the engine 34, the pulley 45 will be rotated at a speed greater than its rotation by the crank 52 and the clutch elements 49 will be centrifugally moved about their respective pivots 50 for engagement with the flanges of the drum 41. The rotation of the drum 41 at a speed greater than the rotation as effected by the crank 52 will effect the over-driving of the ratchet 47 which will slip over the pawl 44. The over-driving of the clutch 39 will rotate the outer drum 61 of the coaster brake 58 and this will also over-drive the connection between the drum 61 and the connection between the drum 61 and shaft 65 engaged therein. In this manner, upon rotation of the engine crankshaft 37, the starting crank 52 may be suspended at rest.

As the motor 34 is connected to the over-driving clutch 39 and shell 61 of the coaster brake 58, it is also connected by way of the chain 74 with the countershaft 71. With the lever 89 in its raised position, the idler wheel 85 will be rocked about its pivot point 82 out of engagement with the belt 77 and the shaft 71 will then be rotated freely from its driving engagement with the axle 17. Upon rocking of the lever 89 downwardly, as effected by the tension of the spring 86, the idler wheel 85 will be pressed into belt-tightening position, shown in Figure 4 of the drawings, and from this position of the belt-tightener 78, the rear wheels 18 will be rotated by the motor 34.

I do not mean to confine myself to the exact details of construction herein disclosed, but claim all variations falling within the purview of the appended claims.

I claim:

1. In a belt and chain transmission for a vehicle, a drive shaft, a first shaft rotatable in one direction arranged in parallel spaced relation with respect to said drive shaft, a pulley mounted on said first shaft for rotation therearound, a drum positioned in side by side relation with respect to said pulley and fixedly carried by said first shaft, a pair of spaced shoes mounted on one face of said pulley adjacent the periphery thereof for movement toward and away from each other and engageable with the inner peripheral surface of said drum, resilient means operatively connected to said pulley and each of said shoes for urging the shoes toward each other, a belt trained over said pulley and said drive shaft for connecting said pulley to said drive shaft, a two part one way clutch having one part fixed on said pulley and having the other part mounted on said first shaft for movement into and out of locking engagement with said first named part, a second shaft rotatable in the same direction as said first shaft positioned in parallel spaced relation with respect to said first shaft, a sprocket on said first shaft, a second sprocket on said second shaft, a chain connecting said sprockets together, a third shaft extending into and connectible to said second shaft for rotation therewith upon rotation of said third shaft in the same direction as said second shaft, a rotatable stub shaft arranged in parallel spaced relation with respect to said third shaft, a third sprocket on said third shaft, a fourth sprocket on said stub shaft, a second chain connecting said third and fourth sprockets together, and a crank lever operatively connected to said stub shaft for rotatably connecting said third shaft to said second shaft.

2. In a transmission for a vehicle, a drive shaft, a first shaft rotatable in one direction arranged in parallel spaced relation with respect to said drive shaft, a pulley mounted on said first shaft for rotation therearound, a drum positioned in side by side relation with respect to said pulley and fixedly carried by said first shaft, a pair of spaced shoes mounted on one face of said pulley adjacent the periphery thereof for movement toward and away from each other and engageable with the inner peripheral surface of said drum, resilient means operatively connected to said pulley and each of said shoes for urging the shoes toward each other, a belt trained over said pulley and said drive shaft for connecting said pulley to said drive shaft, a two part one way clutch having one part fixed on said pulley and having the other part mounted on said first shaft for movement into and out of locking engagement with said first named part, a second shaft rotatable in the same direction as said first shaft positioned in parallel spaced relation with respect to said first shaft, a first means connecting the said first and second named shafts together, a third shaft extending into and connectible to said second shaft for rotation therewith upon rotation of said third shaft in the same direction as said second shaft, a rotatable stub shaft arranged in parallel spaced relation with respect to said third shaft, a second means connecting said third and stub shafts together, and a crank lever operatively connected to said stub shaft for rotatably connecting said third shaft to said second shaft.

3. In a transmission for a vehicle, a drive shaft, a first shaft rotatable in one direction arranged in parallel spaced relation with respect to said drive shaft, a pulley mounted on said first shaft for rotation therearound, a drum positioned in side by side relation with respect to said pulley and fixedly carried by said first shaft, a pair of spaced shoes mounted on one face of said pulley adjacent the periphery thereof for movement toward and away from each other and engageable with the inner peripheral surface of said drum, resilient means operatively connected to said pulley and each of said shoes for urging the shoes toward each other, a belt trained over said pulley and said drive shaft and connecting said pulley to said drive shaft, a two part one way clutch having one part fixed on said pulley and having the other part mounted on said first shaft for movement into and out of locking engagement with said first named part, a second shaft rotatable in the same direction as said first shaft positioned in parallel spaced relation with respect to said first shaft, a first means connecting the said first and second named shafts together, a third shaft extending into and connectible to said second shaft for rotation therewith upon rotation of said third shaft in the same direction as said second shaft, a rotatable stub shaft arranged in parallel spaced relation with respect to said third shaft, a second means connecting said third and stub shafts together, a crank lever operatively connected to said stub shaft for rotatably connecting said third shaft to said second shaft, and power take-off means on said second shaft for transmitting power.

MILTON O. COLDEN.

REFERENCES CITED

The following references are of record in the file of this patent:

UNITED STATES PATENTS

| Number | Name | Date |
| --- | --- | --- |
| 1,200,379 | Lunsford | Oct. 3, 1916 |
| 1,917,775 | Pfluger | July 11, 1933 |
| 2,260,798 | Burns | Oct. 28, 1941 |
| 2,330,677 | Canfield | Sept. 28, 1943 |